United States Patent
Fredette

(10) Patent No.: US 12,277,439 B2
(45) Date of Patent: Apr. 15, 2025

(54) OPERATING SYSTEM PROCESS SCHEDULER WITH LOCATION INERTIA

(71) Applicant: Dell Products L.P., Hopkinton, MA (US)

(72) Inventor: Matthew Fredette, Belmont, MA (US)

(73) Assignee: Dell Products L.P., Hopkinton, MA (US)

( * ) Notice: Subject to any disclaimer, the term of this patent is extended or adjusted under 35 U.S.C. 154(b) by 526 days.

(21) Appl. No.: 17/847,223

(22) Filed: Jun. 23, 2022

(65) Prior Publication Data

US 2023/0418662 A1 Dec. 28, 2023

(51) Int. Cl.
*G06F 9/48* (2006.01)
(52) U.S. Cl.
CPC .................................. *G06F 9/4875* (2013.01)
(58) Field of Classification Search
CPC .................................................... G06F 9/4875
See application file for complete search history.

(56) References Cited

U.S. PATENT DOCUMENTS

| | | | |
|---|---|---|---|
| 2009/0228589 A1* | 9/2009 | Korupolu | H04L 67/1097 709/226 |
| 2012/0254860 A1* | 10/2012 | Bozek | G06F 9/461 718/1 |

\* cited by examiner

*Primary Examiner* — Wissam Rashid
(74) *Attorney, Agent, or Firm* — Anderson Gorecki LLP

(57) ABSTRACT

Processes include inertia bias values associated with migration paths and boundaries. When a process scheduler determines that a process is eligible for migration by comparing a process-related variable with a reference value, a new run domain is selected for the process and the inertia bias value specified by the process for the migration path is applied to the process-related variable to obtain a biased process-related variable. The process scheduler only migrates the process to the new run domain responsive to a determination that the process is still eligible for migration by comparing the biased process-related variable with the reference value. Thus, the process creator can specify process-specific tolerances for migration across NUMA boundaries via various paths.

20 Claims, 3 Drawing Sheets

OPERATING SYSTEM PROCESS SCHEDULER WITH LOCATION INERTIA

TECHNICAL FIELD

The subject matter of this disclosure is generally related to process scheduling with multi-core central processing units (CPUs).

BACKGROUND

High-core-count CPUs are nominally symmetric multi-processors (SMPs) but may be configured in a non-uniform memory access (NUMA) architecture to reduce shared bus contention and reduce memory access latency by prioritizing access to portions of memory based on proximity of location. A NUMA system typically includes multiple sockets that are interconnected by a shared system bus on a single motherboard. Each socket accommodates one package including one or more CPU dies and is local relative to a part of main memory. Each CPU is configured to preferentially use the part of main memory that is local relative to that CPU. A CPU will initially access data in L1 onboard cache, then on a somewhat larger L1/L2 cache chip nearby, and then on an L3 cache part of main memory that the NUMA configuration designates based on locality before the CPU resorts to using remote parts of the main memory located nearer to other CPUs.

A sub-NUMA cluster (SNC) is a localization domain created within a single CPU by mapping addresses from a local memory controller in one half of last level cache (LLC) closer to that memory controller and mapping addresses from another memory controller into the other half of the LLC close to that other memory controller. Processes running on cores on one of the SNC domains using memory from the memory controller in the same SNC domain observe lower LLC and memory latency compared to latency on accesses mapped to locations outside of the same SNC domain.

A process scheduler manages execution and relocation of processes. Processes that are not ready to run are represented in a wait queue. A run queue, also known as the ready list, includes all processes that are ready to run. A wait queue includes processes that are not ready to run. Each CPU has a wait queue and a run queue. Many processes utilize short bursts of CPU cycles interspersed between IO requests, so processes typically do not utilize all available CPU cycles while running. The process scheduler can take advantage of that characteristic by implementing time-sharing in which some running processes are preempted to allow other processes to run. Preempted processes are rescheduled to continue running at a later time. The process scheduler also migrates processes to balance loading of the CPUs. There are two approaches to load balancing among processors. Push migration is a technique in which the operating system checks the loads on CPUs in terms of the number of processes in the CPU run queues and moves processes between CPU run queues to achieve balanced loading. Pull migration is a technique in which the process scheduler responds to detection of an empty CPU run queue by moving processes from other CPU run queues to the empty run queue. When a process scheduler reschedules a preempted process to run on the same CPU from which it was preempted, there is a chance that some of the cached memory and translation lookaside buffer (TLB) lines are still present, which allows the process to run faster because fewer main memory accesses are required. If the process scheduler migrates a process onto a different CPU, then no part of the process will be present in that different CPU's cache and the process will start slowly as it populates the cache and memory local to that different CPU.

SUMMARY

In accordance with some implementations a method comprises: selecting a process from a ready list; calculating whether the process is eligible for migration by comparing a process-related variable with a reference value; and responsive to determining that the process is eligible for migration: selecting a new run domain for the process; determining a migration path to the new run domain; applying a bias value associated with the migration path to the process-related variable to obtain a biased process-related variable; and migrating the process to the new run domain responsive to determining that the process is eligible for migration by comparing the biased process-related variable with the reference value In accordance with some implementations a non-transitory computer-readable storage medium stores instructions that when executed by a computer perform a method comprising: selecting a process from a ready list; calculating whether the process is eligible for migration by comparing a process-related variable with a reference value; and responsive to determining that the process is eligible for migration: selecting a new run domain for the process; determining a migration path to the new run domain; applying a bias value associated with the migration path to the process-related variable to obtain a biased process-related variable; and migrating the process to the new run domain responsive to determining that the process is eligible for migration by comparing the biased process-related variable with the reference value.

In accordance with some implementations an apparatus comprises: a plurality of multi-core central processing units (CPUs) interconnected via a shared bus, each CPU comprising a plurality of nodes, each node comprising one of the cores and associated memory banks; and a process scheduler configured to: select a process from a ready list; calculate whether the process is eligible for migration by comparing a process-related variable with a reference value; and responsive to a determination that the process is eligible for migration: select a new run domain for the process; determine a migration path to the new run domain; apply a bias value associated with the migration path to the process-related variable to obtain a biased process-related variable; and migrate the process to the new run domain responsive to a determination that the process is eligible for migration by comparing the biased process-related variable with the reference value.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media or differentiate between hard disk drives (HDDs) and solid-state drives (SSDs). The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. The implementations described herein should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
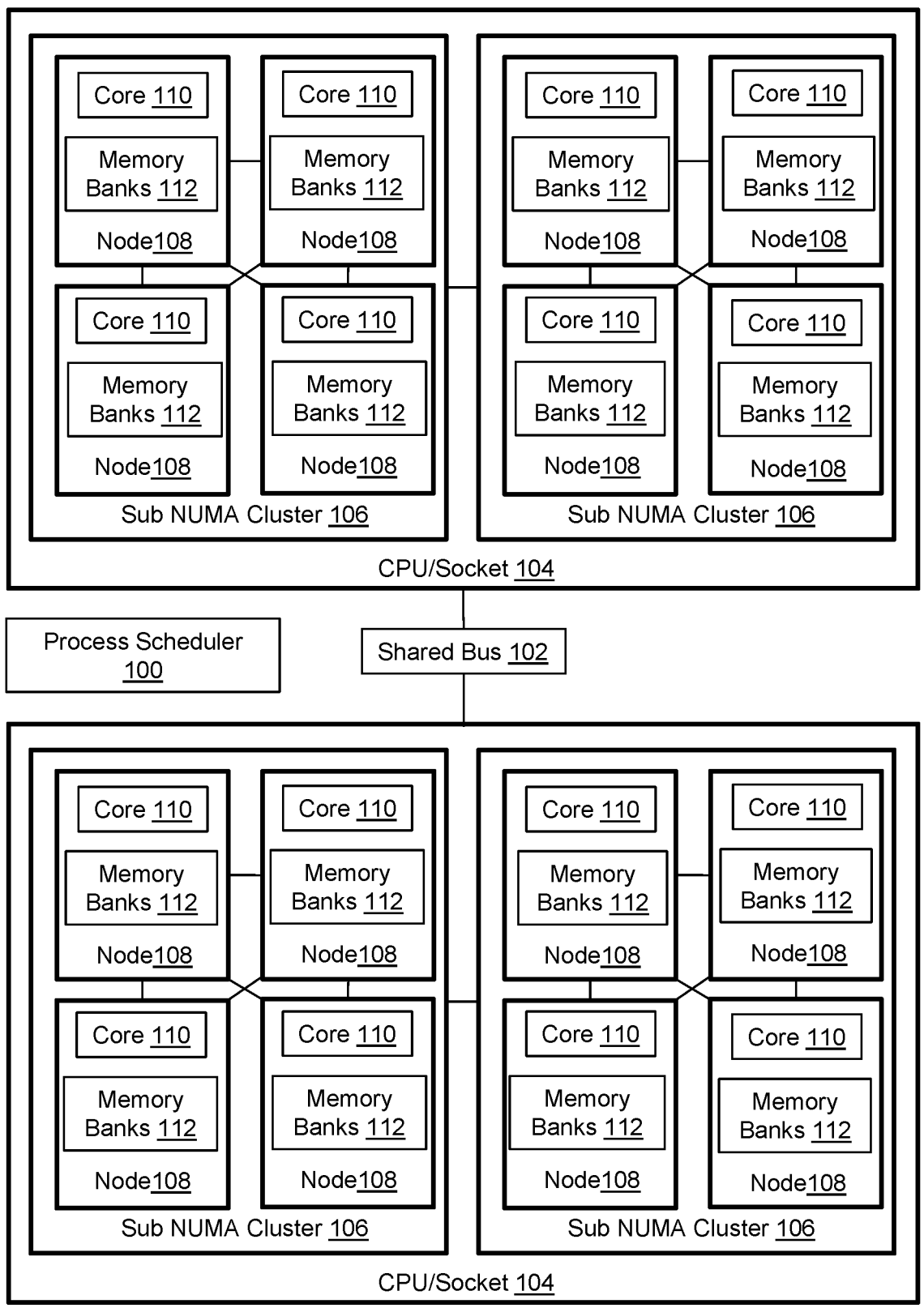
FIG. 1 illustrates a NUMA system with a process scheduler that implements process-designated inertia for migration boundaries and paths.

FIG. 1 illustrates a NUMA system with a process scheduler 100 that implements process-designated inertia for migration boundaries and paths. The system includes multiple CPU/sockets 104 that represent sockets on a single motherboard, each with one package including one or more CPU dies mounted therein. The CPU/sockets 104 are interconnected via a shared bus 102 such as such as a peripheral component interconnect (PCI) bus, ultra path interconnect (UPI), QuickPath Interconnect (QPI), or HyperTransport, for example, and without limitation. Each CPU/socket is organized into multiple sub-NUMA clusters (SNCs) 106 that are interconnected via inter-die links and on-die mesh interconnects. Each sub-NUMA cluster includes multiple nodes 108 that are interconnected via another on-die mesh interconnect. Each node 108 includes a processor core 110 and memory banks 112. The memory banks include the onboard L1 cache, nearby chip-based L1/L2 cache, and the L3 cache part of main memory that the NUMA configuration provides to the core based on locality. As will be explained below, the process scheduler 100 biases migration of processes in run queues based on migration paths that traverse boundaries characterized by differences in bus speed or bandwidth and/or cache subdivision locality, including but not limited to nodal boundaries, sub-NUMA cluster boundaries, inter-die boundaries on a socket, and CPU/socket (inter-socket) boundaries based on process-specified configurations.

Figure 2:
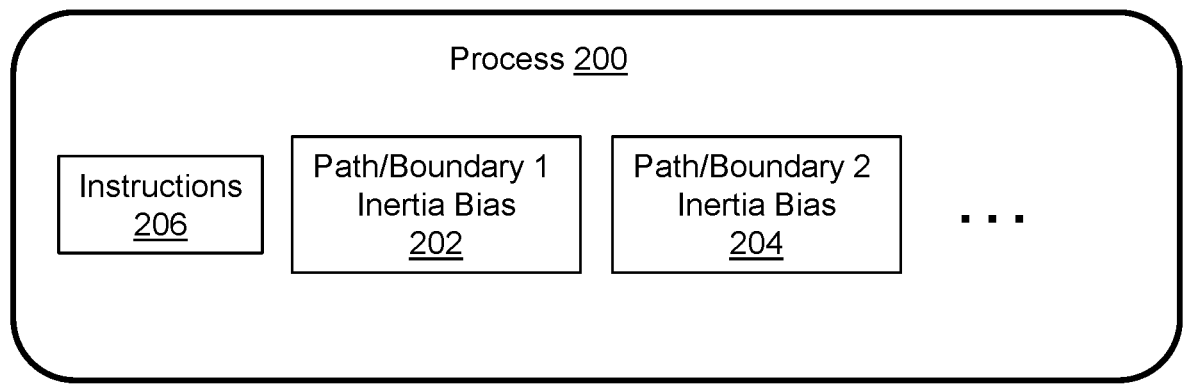
FIG. 2 illustrates a process in which inertia biases are specified for different boundaries and/or paths.

FIG. 2 illustrates a process 200 in which path/boundary inertia biases 202, 204 are specified for different paths and/or boundaries. Any number of inertia biases could be specified for any number of paths and boundaries. The process 200 includes instructions 206 that are executable on any of the CPU cores and the inertia bias values for the specified paths and boundaries. The process scheduler may be configured to trigger migration of processes based on any of a wide variety of algorithms and triggering conditions. For example, and without limitation, the process scheduler may compare a time value T_next representative of when a process should ideally run next with current time T to determine whether the process is eligible for migration, e.g., calculating whether T_next is earlier than the current time T. If the process is eligible for migration, then the migration target is selected and the path/boundary inertia bias specified by the process for the path/boundary between the migration source and the migration target is selected and applied to T_next, e.g., yielding T_next_plus_inertia. The biased value T_next_plus_inertia is compared with the current time T and the process is only migrated if T_next_plus_inertia is earlier than the current time T. The process is not migrated if T_next_plus_inertia is later than the current time T. Consequently, a process will not be moved from one CPU to another CPU until it has been unable to run for so long that the process-specified inertia that it has for remaining on its current CPU has been overcome. Advantageously, each process has fine-grained control over its inertia values and can define different values for each path that it could take to move between locations in the system. These different values could be selected based on the size of the process's data set and the cost of moving that data set over the various different-cost paths connecting the CPU partitions in the system, for example, and without limitation.

Figure 3:
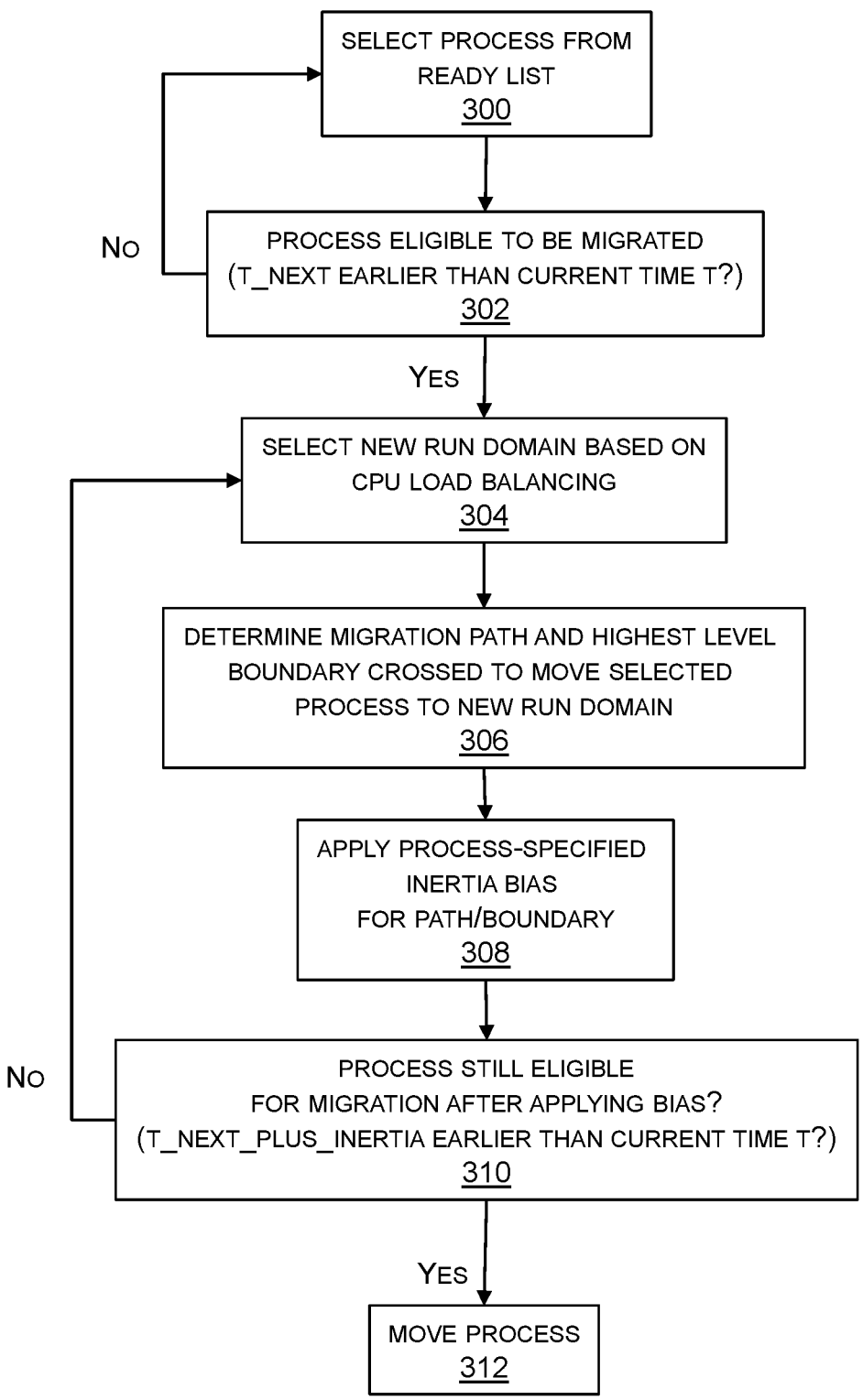
FIG. 3 illustrates use of the inertia biases by the process scheduler to selectively migrate processes.

FIG. 3 illustrates use of the inertia biases by the process scheduler to selectively migrate processes. Step 300 is selecting a process to be considered from the ready list. Step 302 is determining whether the selected process is eligible for migration. In some implementations the determination is made by comparing a process-related value with a reference value, e.g., determining whether T_next for the process earlier than the current time T. In that example the process is eligible for migration if T_next is earlier than the current time T. The process is not eligible for migration is T_next is later than the current time T. If the process is not eligible for migration, then a different process is selected by returning to step 300. If the process is eligible for migration, then a new run domain is selected based on CPU load balancing as indicated in step 304. The new run domain may be, in increasing boundary hierarchy levels, a different node within the same SNC, a different SNC within the same CPU/socket, or a different CPU/socket. The highest-level boundary and path traversed are determined in step 306. In step 308 the process scheduler applies the process-specified inertia bias for the path/boundary identified in step 306 to the process-related value, e.g., calculating T_next_plus_inertia using the inertia value specified by the process for the path/boundary identified in step 306. Step 310 is determining whether the process is still eligible for migration after applying the bias. In some implementations the determination is made by comparing T_next_plus_inertia with the current time, e.g., determining whether T_next_plus_inertia is earlier than T. If the process is still eligible for migration as biased, e.g., T_next_plus_inertia is earlier than T, then the process is migrated as indicated in step 312. If the process is not still eligible for migration as biased, e.g., T_next_plus_inertia is later than T, then a different domain is selected as indicated in step 304. Steps 304 through 310 are iterated until the process is migrated or all potential new domains have been tested.

Although advantages should not be considered necessary or critical to the invention, at least some implementations enable programmers to specify tolerance for migration across various paths and boundaries. Some processes are more tolerant of migrations than other processes. However, the compute node designer typically does not know which processes will be run on the compute node and how tolerant those processes are of different migration paths and boundaries. The programmers who create processes are in a better position to determine migration tolerance. Consequently, aspects disclosed herein may improve performance relative to a process scheduler that treats all processes as equally tolerant of migrations.

Specific examples have been presented to provide context and convey inventive concepts. The specific examples are not to be considered as limiting. For example, the inventive concepts are not limited to NUMA systems. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    selecting a process from a ready list;
    calculating whether the process is eligible for migration by comparing a process-related variable with a reference value; and
    responsive to determining that the process is eligible for migration:
        selecting a new run domain for the process;
        determining a migration path to the new run domain;
        applying a bias value associated with the migration path to the process-related variable to obtain a biased process-related variable; and
        migrating the process to the new run domain responsive to determining that the process is eligible for migration by comparing the biased process-related variable with the reference value.

2. The method of claim 1 further comprising not migrating the process to the new run domain responsive to determining that the process is not eligible for migration by comparing the biased process-related variable with the reference value.

3. The method of claim 2 further comprising obtaining the bias value from the process.

4. The method of claim 3 further comprising obtaining the bias value from a plurality of bias values associated with different migration paths or boundaries.

5. The method of claim 4 further comprising selecting the new run domain for the process by performing load balancing based on relative fullness of run queues.

6. The method of claim 5 further comprising calculating whether the process is eligible for migration by determining whether a time value T_next representative of when a process should run next is earlier than current time T.

7. The method of claim 6 further comprising comparing the biased process-related variable with the reference value by determining whether T_next plus the bias value is later than T.

8. A non-transitory computer-readable storage medium that stores instructions that when executed by a computer perform a method comprising:
    selecting a process from a ready list;
    calculating whether the process is eligible for migration by comparing a process-related variable with a reference value; and
    responsive to determining that the process is eligible for migration:
        selecting a new run domain for the process;
        determining a migration path to the new run domain;
        applying a bias value associated with the migration path to the process-related variable to obtain a biased process-related variable; and
        migrating the process to the new run domain responsive to determining that the process is eligible for migration by comparing the biased process-related variable with the reference value.

9. The non-transitory computer-readable storage medium of claim 8 further comprising not migrating the process to the new run domain responsive to determining that the process is not eligible for migration by comparing the biased process-related variable with the reference value.

10. The non-transitory computer-readable storage medium of claim 9 further comprising obtaining the bias value from the process.

11. The non-transitory computer-readable storage medium of claim 10 further comprising obtaining the bias value from a plurality of bias values associated with different migration paths or boundaries.

12. The non-transitory computer-readable storage medium of claim 11 further comprising selecting the new run domain for the process by performing load balancing based on relative fullness of run queues.

13. The non-transitory computer-readable storage medium of claim 12 further comprising calculating whether the process is eligible for migration by determining whether a time value T_next representative of when a process should run next is earlier than current time T.

14. The non-transitory computer-readable storage medium of claim 13 further comprising comparing the biased process-related variable with the reference value by determining whether T_next plus the bias value is later than T.

15. An apparatus comprising:
    a plurality of multi-core central processing units (CPUs) interconnected via a shared bus, each CPU comprising a plurality of nodes, each node comprising one of the cores and associated memory banks; and
    a process scheduler configured to:
        select a process from a ready list;
        calculate whether the process is eligible for migration by comparing a process-related variable with a reference value; and
        responsive to a determination that the process is eligible for migration:
            select a new run domain for the process;
            determine a migration path to the new run domain;
            apply a bias value associated with the migration path to the process-related variable to obtain a biased process-related variable; and
            migrate the process to the new run domain responsive to a determination that the process is eligible for migration by comparing the biased process-related variable with the reference value.

16. The apparatus of claim 15 further comprising the process scheduler configured to not migrate the process to the new run domain responsive to determining that the process is not eligible for migration by comparing the biased process-related variable with the reference value.

17. The apparatus of claim 16 further comprising the process scheduler configured to obtain the bias value from the process.

18. The apparatus of claim 17 further comprising the process scheduler configured to obtain the bias value from a plurality of bias values associated with different migration paths or boundaries.

19. The apparatus of claim 18 further comprising the process scheduler configured to select the new run domain for the process by performing load balancing based on relative fullness of run queues.

20. The apparatus of claim 19 further comprising the process scheduler configured to calculate whether the process is eligible for migration by determining whether a time value T_next representative of when a process should run next is earlier than current time T.

\* \* \* \* \*